United States Patent
Fujiwara

[11] Patent Number: 5,880,785
[45] Date of Patent: Mar. 9, 1999

[54] MOVING PICTURE CODING APPARATUS WITH TOTAL DATA AMOUNT CONTROL

[75] Inventor: Mitsuaki Fujiwara, Yokosuka, Japan

[73] Assignee: Victor Company of Japan, Ltd., Yokohama, Japan

[21] Appl. No.: 699,644

[22] Filed: Aug. 19, 1996

[51] Int. Cl.⁶ .................................................. H04N 7/32
[52] U.S. Cl. ........................................ 348/405; 348/420
[58] Field of Search .................................. 348/384, 390, 348/396, 400–402, 404, 405, 409–413, 415, 416, 420, 699; 382/232, 236, 238, 251; H04N 7/137

[56] References Cited

U.S. PATENT DOCUMENTS

| | | | |
|---|---|---|---|
| 5,144,426 | 9/1992 | Tanaka et al. | 348/409 |
| 5,291,282 | 3/1994 | Nakagawa et al. | 348/415 |
| 5,337,049 | 8/1994 | Shimoda | 348/420 |
| 5,469,213 | 11/1995 | Koga et al. | 348/401 |
| 5,510,842 | 4/1996 | Phillips et al. | 348/416 |
| 5,559,557 | 9/1996 | Kato | 348/405 |
| 5,610,659 | 3/1997 | Maturi et al. | 348/396 |

FOREIGN PATENT DOCUMENTS

| | | |
|---|---|---|
| 0595268 | 5/1994 | European Pat. Off. . |
| 0670663 | 9/1995 | European Pat. Off. . |
| 0689360 | 12/1995 | European Pat. Off. . |

*Primary Examiner*—Richard Lee
*Attorney, Agent, or Firm*—Jacobson, Price, Holman & Stern, PLLC

[57] ABSTRACT

A coding apparatus for coding a video signal by way of total data amount control. The video signal is coded by high efficient predictive coding to produce first encoded data. A data amount of the first encoded data is counted and converted to a target data amount within a reference data amount. In response to the target data amount, quantization is controlled in the high efficient predictive coding. The coding is again carried out to produce second encoded data under quantization control. The quantization is corrected in the high efficient predictive coding in response to the target data amount and a data amount of the second encoded data. The second encoded data is outputted at a specific data transfer rate.

9 Claims, 8 Drawing Sheets

MOVING PICTURE CODING APPARATUS WITH TOTAL DATA AMOUNT CONTROL

BACKGROUND OF THE INVENTION

The present invention relates to a moving picture coding apparatus with total data amount control.

There is a conventional moving picture coding apparatus with total data amount control. The conventional apparatus carries out twice coding operations in the total data amount control. High efficiently encoded data of data amount suitable for storage capacity of a storage medium to store the encoded data is output from the coding apparatus at a variable rate.

In the first coding operation, encoded data amount of a video signal is checked to decide a target data transfer rate and a target data amount with respect to the storage medium. In the second coding operation, the video signal is again encoded by a quantization scale corrected based on the target data amount. The encoded data whose amount is changed to the target amount is stored into a buffer memory. The stored encoded data is outputted from the buffer memory at the target transfer rate.

The conventional apparatus, however, does not check the encoded data amount in the second coding operation. Therefore, the conventional apparatus has a disadvantage in that the encoded data amount outputted from the buffer memory, in the second coding operation, is not necessarily suitable for the storage capacity of the storage medium. Further, picture quality of the video signal to be reproduced from the storage medium depends on the data sufficiency of the buffer memory.

SUMMARY OF THE INVENTION

An object of the present invention is to provide a moving picture coding apparatus with total data amount control in that the encoded data amount outputted therefrom, in the second coding operation, is always suitable for the storage capacity of a storage medium to store the encoded data.

The present invention provides an apparatus for coding a video signal comprising: coding means for coding the video signal by high efficient predictive coding to produce first encoded data; counting means for counting a data amount of the first encoded data; first changing means for changing the data amount of the first encoded data to a target data amount within a reference data amount; control means, responsive to the target data amount, for controlling quantization in the high efficient predictive coding by the coding means, under the control of the control means, the coding means again coding the video signal to produce second encoded data; correcting means for correcting the quantization in the high efficient predictive coding in response to the target data amount data of the first encoded and a data amount of the second encoded data; and output means for outputting the second encoded data at a specific data transfer rate.

The counting means may comprise when the first encoded data includes a plurality of sequential data groups, each data group having a plurality of sequential picture data, and each picture data having a plurality of sequential block data: means for counting a data amount of each of the sequential block data to output sequential block data amounts; means, responsive to the sequential block data amounts, for counting a data amount of each of the sequential picture data to output sequential picture data amounts; and means, responsive to the sequential picture data amounts, for counting a data amount of each of the sequential data group to output sequential data group amounts.

The first converting means may comprise: means for converting the data amount of the first encoded data to a plurality of different data amounts by means of a plurality of different data amount conversion characteristics; and means for comparing the different data amounts with the reference data amount to find a maximum data amount among the different data amounts within the reference data amount, the maximum data amount being outputted as the target data amount.

The correcting means comprises: subtracting means for subtracting the target data amount of the first encoded data from the data amount of the second encoded data to produce data amount error; second converting means for converting the target data amount of the first encoded data based on the data amount error; comparing means for comparing the data amount of the second encoded data and the converted target data amount of the first encoded data to produce a first signal for controlling a quantization scale of the coding means; and setting means for setting the quantization scale in response to the converted target data amount to produce a second signal for controlling the quantization scale, wherein either one of the first and second signals is supplied to the control means to control the quantization in the high efficient predictive coding by the coding means.

The present invention further provides a method for coding a video signal comprising the steps of: coding the video signal by high efficient predictive coding to produce first encoded data; counting a data amount of the first encoded data; converting the data amount of the first encoded data to a target data amount within a reference data amount; controlling quantization in the high efficient predictive coding, in response to the target data amount, the video signal being coded again to produce second encoded data; correcting the quantization in the high efficient predictive coding in response to the target data amount of the first encoded data and a data amount of the second encoded data; and outputting the second encoded data at a specific data transfer rate.

The counting step may comprise the steps of, when the first encoded data includes a plurality of sequential data groups, each data group having a plurality of sequential picture data, and each picture data having a plurality of sequential block data counting a data amount of each of the sequential block data to output sequential block data amounts counting a data amount of each of the sequential picture data in response to the sequential block data amounts to output sequential picture data amounts; counting a data amount of each of the sequential data group in response to the sequential picture data amounts to output sequential data group amounts.

The converting step may comprise the steps of: converting the data amount of the first encoded data to a plurality of different data amounts by means of a plurality of different data amount conversion characteristics; and comparing the different data amounts with the reference data amount to find a maximum data amount among the different data amounts within the reference data amount, the maximum data amount being outputted as the target data amount.

The correcting step may comprise the steps of: subtracting the target data amount of the first encoded data from the data amount of the second encoded data to produce data amount error; converting the target data amount of the first encoded data based on the data amount error; comparing the data amount of the second encoded data and the converted target data amount of the first encoded data to produce a first signal for controlling a quantization scale of the coding; and setting the quantization scale in response to the converted target data amount to produce a second signal for controlling the quantization scale, wherein either one of the first and second signals is used to control the quantization in the high efficient predictive coding.

DETAILED DESCRIPTION OF THE PREFERRED EMBODIMENTS

A preferred embodiment of a moving picture coding apparatus with total data amount control according to the present invention will be described with reference to attached figures.

Figure 1:
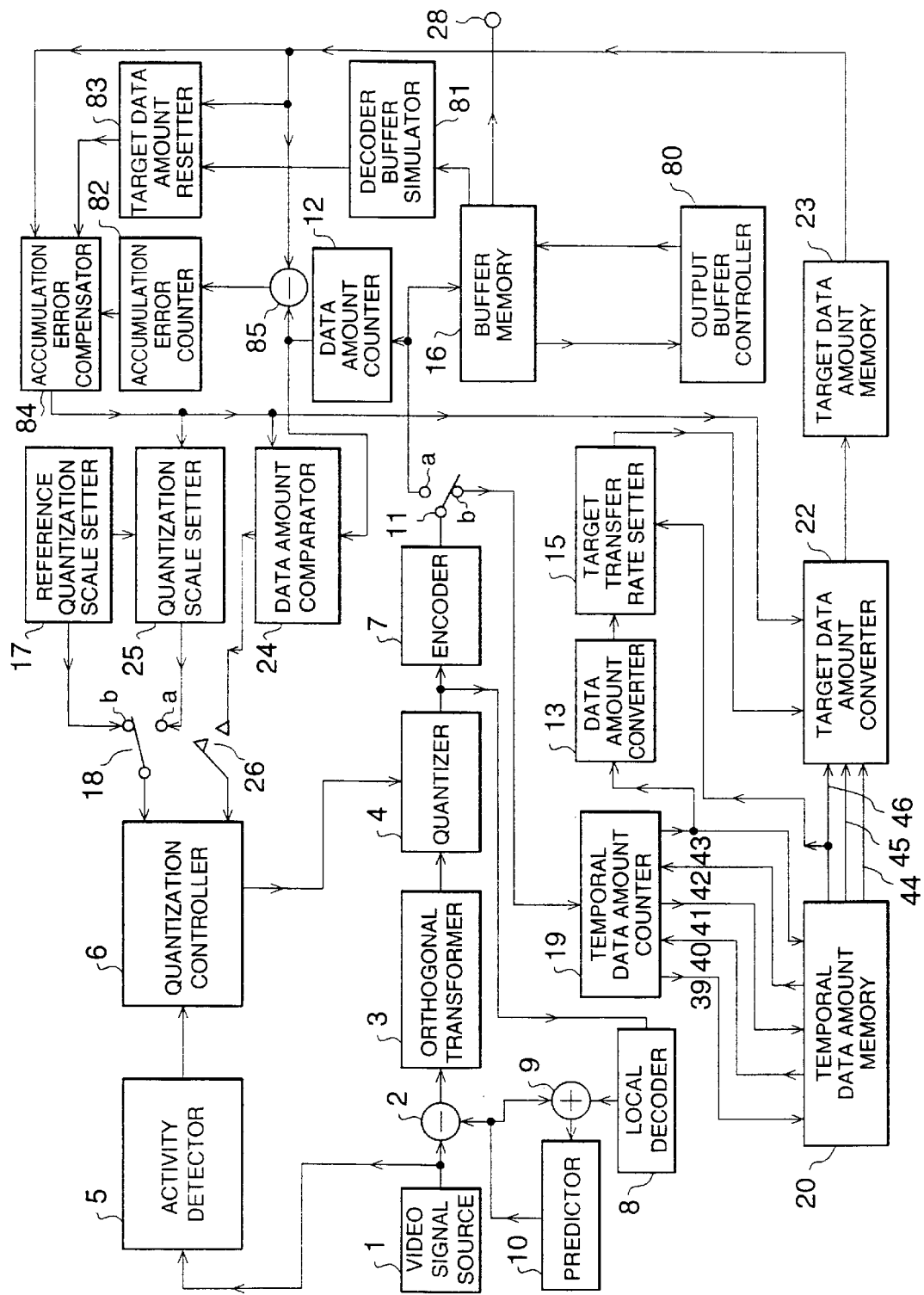
FIG. 1 shows a block diagram of a preferred embodiment of the moving picture coding apparatus with total data amount control according to the present invention.
Figure 2:
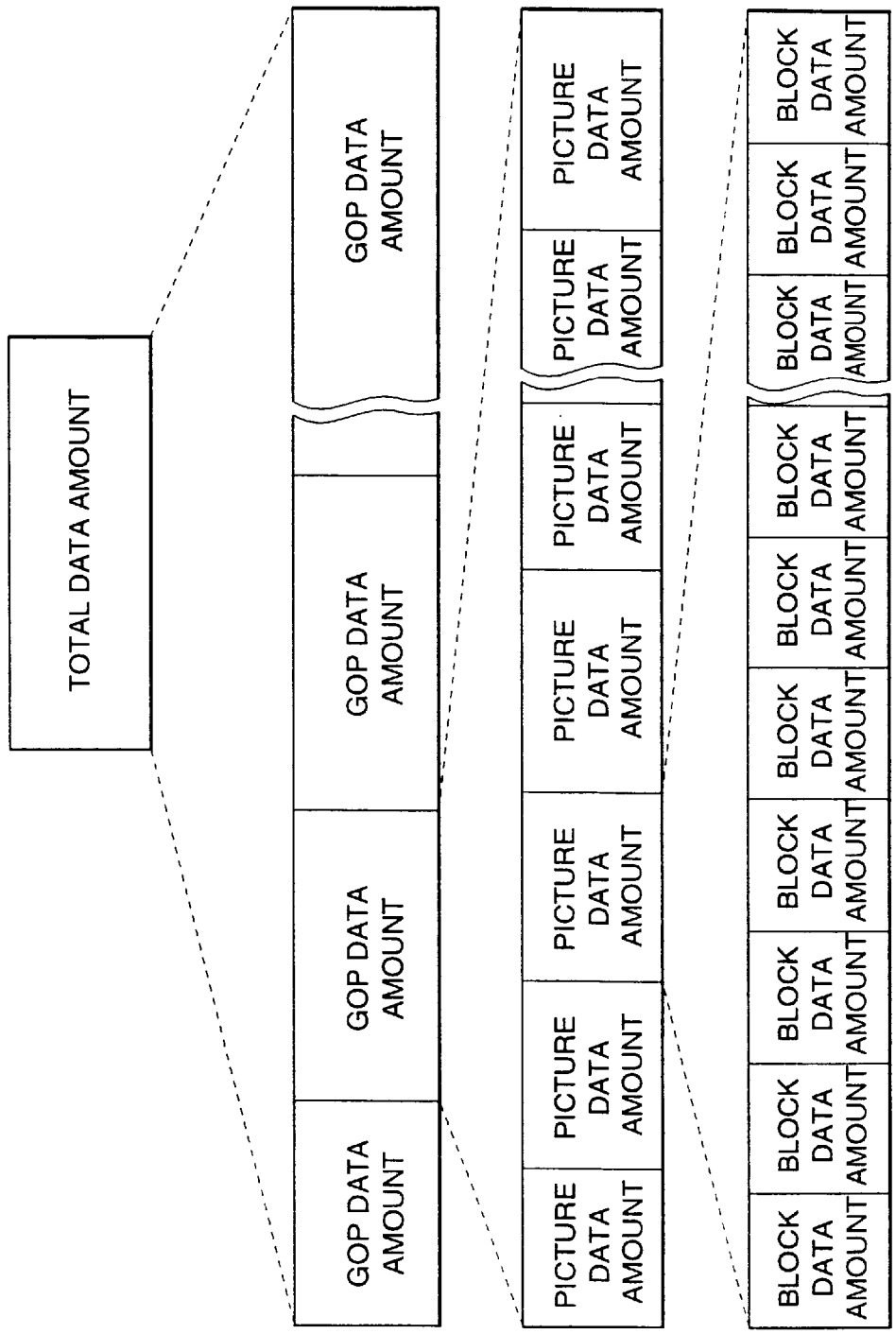
FIG. 2 shows a data format of a video signal to be coded by the coding apparatus of FIG. 1.

In FIG. 1, firstly, switches 11 and 18 are switched to a terminal b and a switch 26 is turned off in the first coding operation. A video signal is supplied from a video signal source 1 to a predictive subtractor 2 and an activity detector 5. Based on distribution of pixel values, absolute value addition of predictive error values or absolute value addition of orthogonal transform coefficients, the activity detector 5 detects the activity of video data per block of each of sequential blocks (e.g., 8×8 pixels) of the video signal; and generates a signal for a quantization scale (the number of quantized bits) decided by a quantization controller 6. FIG. 2 shows that a picture consists of sequential blocks and a group of pictures (GOP) consists of a plurality of pictures.

The quantization scale signal is supplied from the activity detector 5 to the quantization controller 6. Also supplied to the quantization controller 6 is a signal for a predetermined quantization scale from a reference quantization setter 17 via switch 18. The quantization controller 6 sets the quantization scale of a quantizer 4 to a small value when a video signal of low activity, but to a large value when high activity.

On the other hand, the video signal is supplied from the video signal source 1 to the predictive subtractor 2. The predictive substractor 2 subtracts an output signal of a predictor 10 from the video signal to produce a predictive error signal. The predictive error signal is supplied to an orthogonal transformer 3 to produce orthogonal transform coefficients. The orthogonal transform coefficients are supplied to the quantizer 4 and are quantized with the quantization scale set by the quantization controller 6. The quantized data is supplied to an encoder 7 and a local decoder 8.

The local decoder 8 decodes the quantized data to reproduce the predictive error signal by inverse quantization and inverse orthogonal transformation. The reproduced predictive error signal is supplied to an adder 9. The adder 9 adds the reproduced predictive error signal and a (inter-picture) predictive signal supplied from the (inter-picture) predictor 10. An output signal of the adder 9 is supplied to the predictor 10. The predictor 10 generates the predictive signal by motion compensation with one picture delay. The predictive signal is supplied to the predictive subtractor 2 and adder 9.

The encoder 7 encodes the quantized data supplied from the quantizer 4 by variable length-coding to output compressed encoded data of sequential blocks that are supplied to the switch 11. Since the switch 11 has been switched to the terminal b, the compressed encoded data are supplied to a temporal data amount counter 19 via switch 11. Temporal data are stored into a temporal data amount memory 20, and read therefrom and again supplied to the temporal data amount counter 19 via transmission lines 39 to 43.

Figure 3:
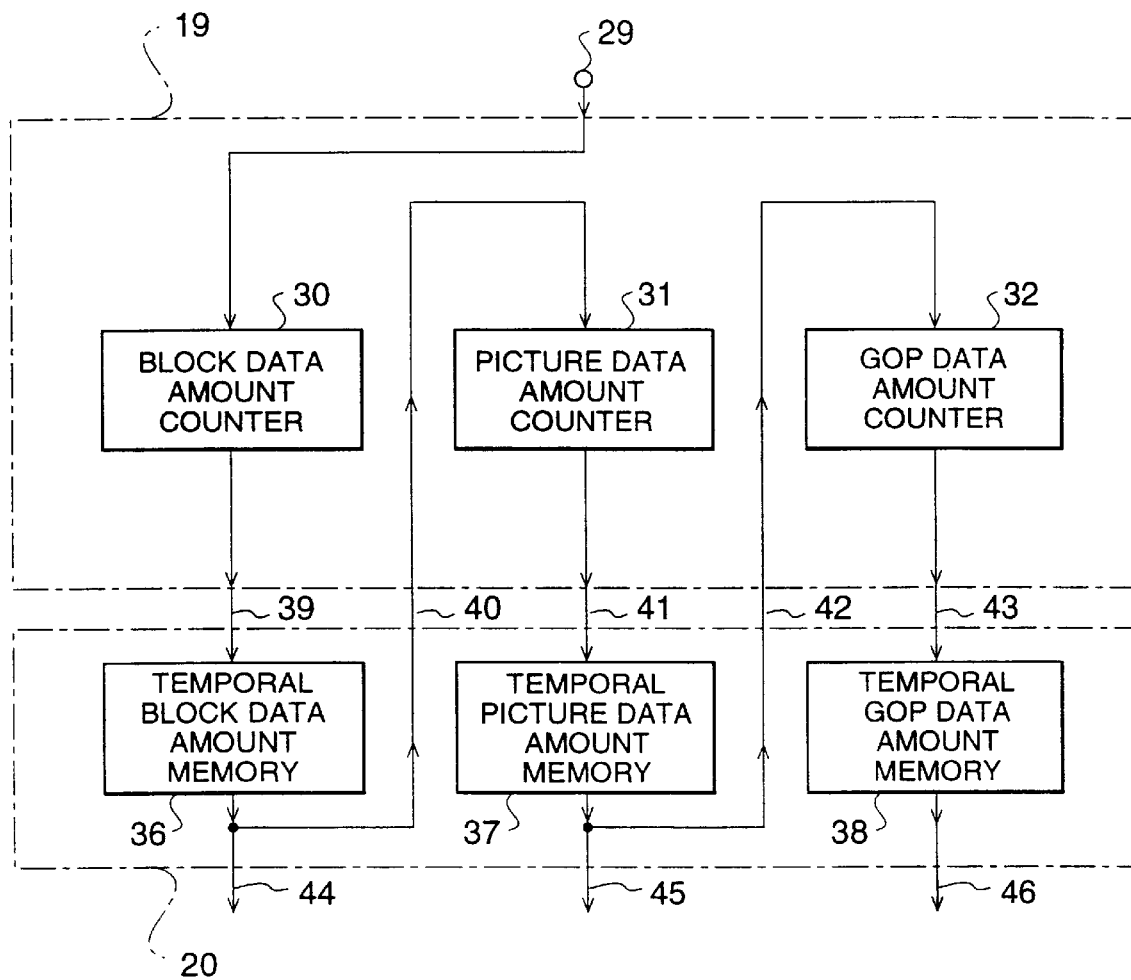
FIG. 3 shows a block diagram of a temporal data amount counter and a temporal data amount memory of the coding apparatus of FIG. 1.

The temporal data amount counter 19 and the temporal data amount memory 20 will be described with reference to FIG. 3. In FIG. 3, the temporal data amount counter 19 consists of a block data amount counter 30, a picture data amount counter 31, and a GOP data amount counter 32. The temporal data amount memory 20 consists of a temporal block data amount memory 36, a temporal picture data amount memory 37, and a temporal GOP data amount memory 38.

In FIG. 3, the encoded data of sequential blocks are supplied from the encoder 7 to the block data amount counter 30 via input terminal 29. The encoded data amounts are sequentially counted by the block data amount counter 30 to obtain a block data amount. Whenever one block data amount is counted, one block data amount is stored into the temporal block data amount memory 36 via transmission line 39.

Each block data amount stored in the temporal block data amount memory 36 is read therefrom and supplied to the picture data amount counter 31 via transmission line 40. The block data amounts are sequentially counted by the picture data amount counter 31 to obtain a picture data amount. Whenever one picture data amount is counted, one picture amount is stored into the temporal picture data amount memory 37 via transmission line 41.

Each picture data amount stored in the temporal picture data amount memory 37 is read therefrom and supplied to the GOP data amount counter 32 via transmission line 42. The picture data amounts are sequentially counted by the GOP data amount counter 32. Whenever one GOP data amount is detected, one GOP data amount is stored into the temporal GOP data amount memory 38 via transmission line 43.

The data amounts of the block, picture, and GOP data stored in the temporal data amount memories 36, 37, and 38, respectively, are read therefrom in the second coding operation of the video signal supplied from the video signal source 1.

In FIG. 3, the temporal data amount counter 19 counts the data amounts of three stages of encoded data, that is, block, picture, and GOP, separately. Further, the temporal data amount memory 20 stores amounts of encoded data of block, picture, and GOP, separately. Not limited only to this, the counter 19 and memory 20 can be designed to process encoded data of block, macroblock, slice, picture, and GOP, separately. These five stages of encoded data can be arranged in accordance with ISO 11172-2 (Moving Picture international Standard). In general, N stages of encoded data can be separately counted their amounts and stored temporally for twice coding operations.

In the first coding operation, the temporal data amounts of the GOP data are sequentially supplied from the temporal data amount counter 19 to a data amount converter 13 via transmission line 43. The amount of each of sequential GOP data is converted to a target amount by the data amount converter 13 in accordance with data amount conversion characteristics.

The data amount converter 13 will be described in detail with reference to FIG. 4. The data amount converter 13 is provided with N number of converters 61, 62, 63, . . . , and Na, accumulators 65, 66, 67, . . . , and Nb, and comparators 69, 70, 71, . . . , and Nc. The data amount converter 13 is further provided with a total target data amount setter 60 and a determiner 73. Used as the total target data amount is the total storage capacity of a storage medium that stores encoded data obtained by efficient-coding a video signal.

Here, the temporal data amount of each of the GOP data sequentially supplied from the temporal data amount counter 19 is expressed as T1(i) and the target data amount to be obtained by converting the temporal data amount T1(i) by the data amount converter 13 in accordance with the code amount conversion characteristics fg is expressed as T2(i). The sign "i" means the ith GOP data. The relationship among the temporal data amount T1(i), target data amount T2(i), and conversion characteristics fg is expressed as follows:

$$T2(i)=fg\{T1(i)\} \quad (1)$$

where the upper limit of the target data amount T2(i) depends on the capacity of a storage medium that stores encoded data or specifications of a decoding apparatus.

Figure 5:
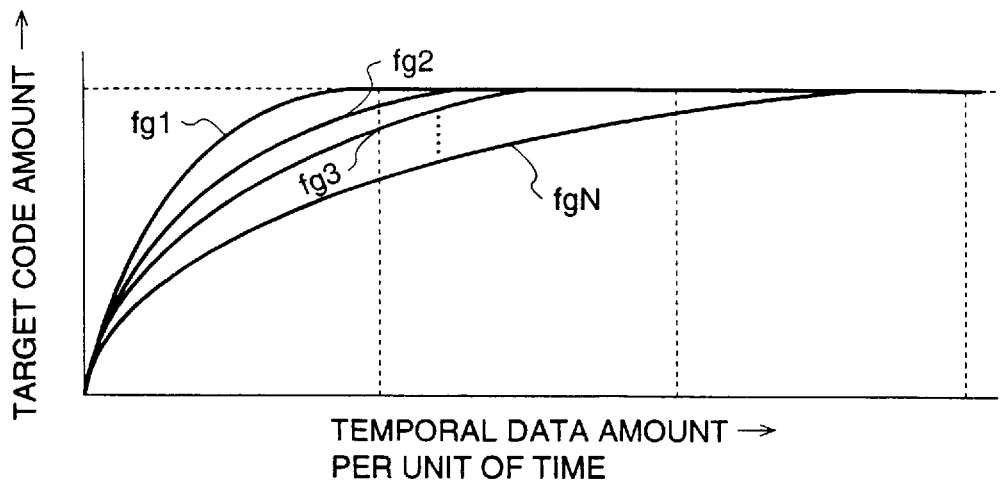
FIG. 5 depicts the data amount change characteristics of a data amount changer of the coding apparatus of FIG. 1.

The conversion characteristics fg is shown in FIG. 5 and expressed as follows:

$$fg(x)=k \cdot S2/S1 \cdot x \quad (2)$$

where S1 is the total temporal data amount, S2 is the target data amount in the second coding operation, and K is a constant larger than zero. In FIG. 5, curves fg1, fg2, fg3, . . . , and fgN depict the conversion characteristics fg of the converters 61, 62, 63, . . . , and Na, respectively.

In stead of the expression (2), the characteristics fg can be expressed as follows:

$$fg(x)=a \times b \quad (3)$$

where "^" means powers, a is a constant larger than zero, and b is another constant larger than zero but smaller than one. The characteristics fg expressed by the expression (3) is useful when a small amount of GOP data is converted to a large amount to avoid picture quality deterioration.

Figure 4:
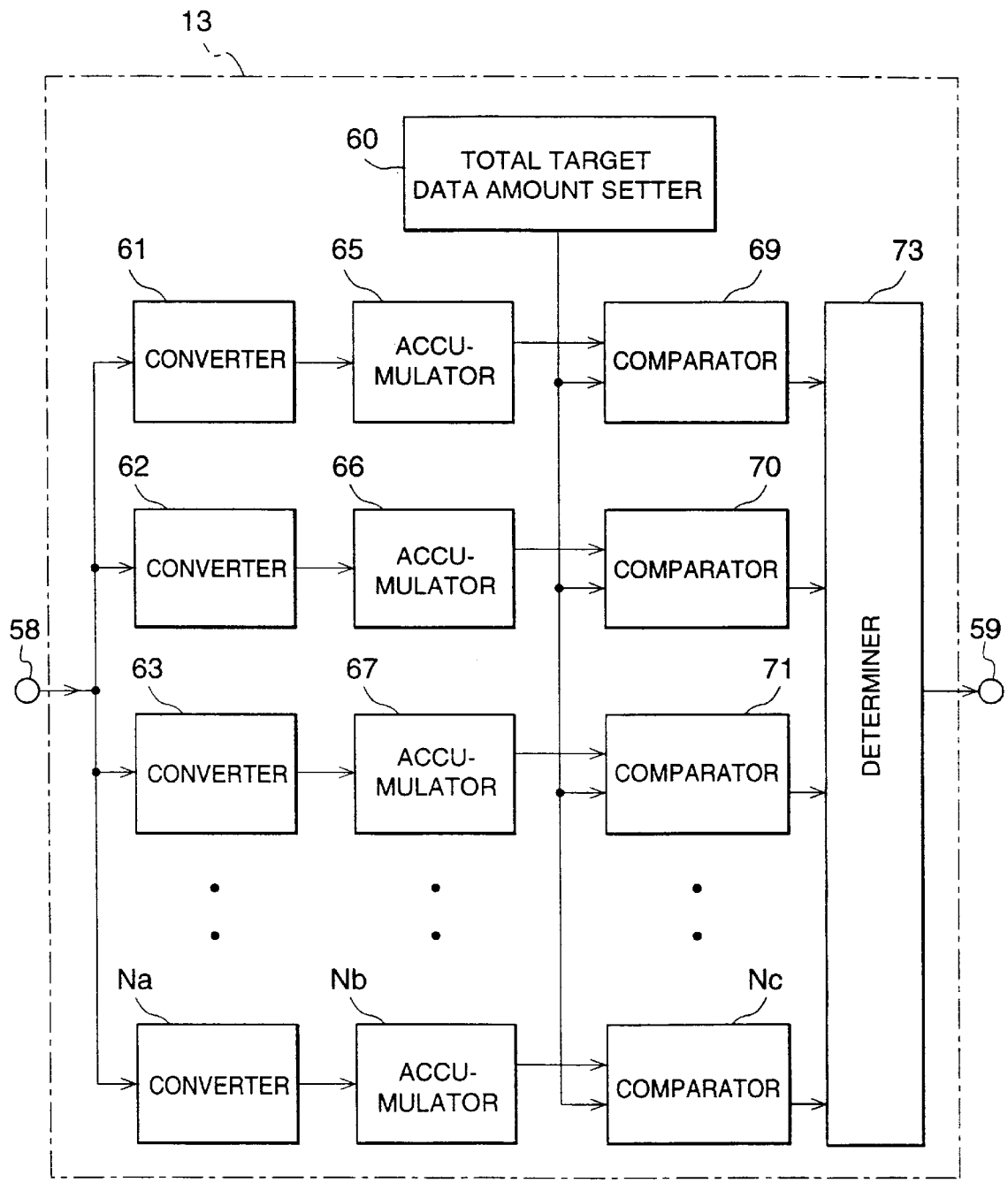
FIG. 4 shows a block diagram of a data amount changer of the coding apparatus of FIG. 1.

In FIG. 4, the temporal data amounts of the GOP data are sequentially supplied from the temporal data amount counter 19 to the data amount converter 13 via input terminal 58. The same GOP data amount is supplied to the converters 61, 62, 63, . . . , and Na with different conversion characteristics fg as shown in FIG. 5. The N number of different amounts converted by the converters 61, 62, 63, . . . , and Na are supplied to the accumulators 65, 66, 67, . . . , and Nb, respectively. Each accumulator accumulates sequential data amounts to obtain the total amount of the encoded data of the video signal supplied from the video signal source 1. The N number of accumulated data amounts are supplied to the comparators 69, 70, 71, . . . , Nc, respectively, and compared with the same target total data amount supplied from the target total data amount setter 60.

The N number of comparison results are supplied from the comparators 69, 70, 71, . . . , Nc to the determiner 73. The determiner 73 detects the conversion characteristics fg among the different ones shown in FIG. 5 by which the largest data amount is produced within the target total data amount; and determines the data transfer rate that corresponds to the largest data amount. The data transfer rate signal is supplied to a target transfer rate setter 15 shown in FIG. 1.

In FIG. 1, next, the switches 11 and 18 are switched to a terminal a and the switch 26 is turned on in the second coding operation. The video signal is supplied again from the video signal source 1 to the predictive subtractor 2 and the activity detector 5.

The activity detector 5 detects the activity of video data of each of sequential blocks (e.g., 8×8 pixels) of the video signal; and generates a signal for a quantization scale that is supplied to the quantization controller 6. Also supplied to the quantization controller 6 is a signal for another quantization scale per initial block of each picture from a quantization scale setter 25 via switch 18. In a period where the quantization scale setter 25 does not supply the signal to the quantization controller 6, a different quantization scale control signal is supplied to the quantization controller 6 from a data amount comparator 24 via switch 26.

The quantized data outputted from the quantizer 4 is again supplied to the encoder 7 and also to the local decoder 8 for the predictive operation in the second coding operation the same as in the first coding operation. However, in the second operation, encoded data outputted from the encoder 7 are sequentially supplied to a data amount counter 12 via switch 11. A data amount counted by the data amount counter 12 is supplied to a subtractor 85. Also supplied to the subtractor 85 is a target data amount from a target data amount memory 23.

The encoded data outputted from the encoder 7 are also sequentially supplied to a buffer memory 16 under the control of the output buffer controller 80. Data amount (buffer sufficiency) stored in the buffer memory 16 is read out therefrom and supplied to the output buffer controller 80. In response to the buffer sufficiency, the output buffer controller 80 generates data transfer rate signal per unit of time that is supplied to the buffer memory 16. The data amount may be expressed as a difference between a write and read addresses of the buffer memory 16.

The encoded data stored in the buffer memory 16 is read out therefrom in accordance with the transfer rate signal and outputted via output terminal 28. The transfer rate of each output encoded data thus depends on the data transfer rate information supplied by the output buffer controller 80.

Figure 6:
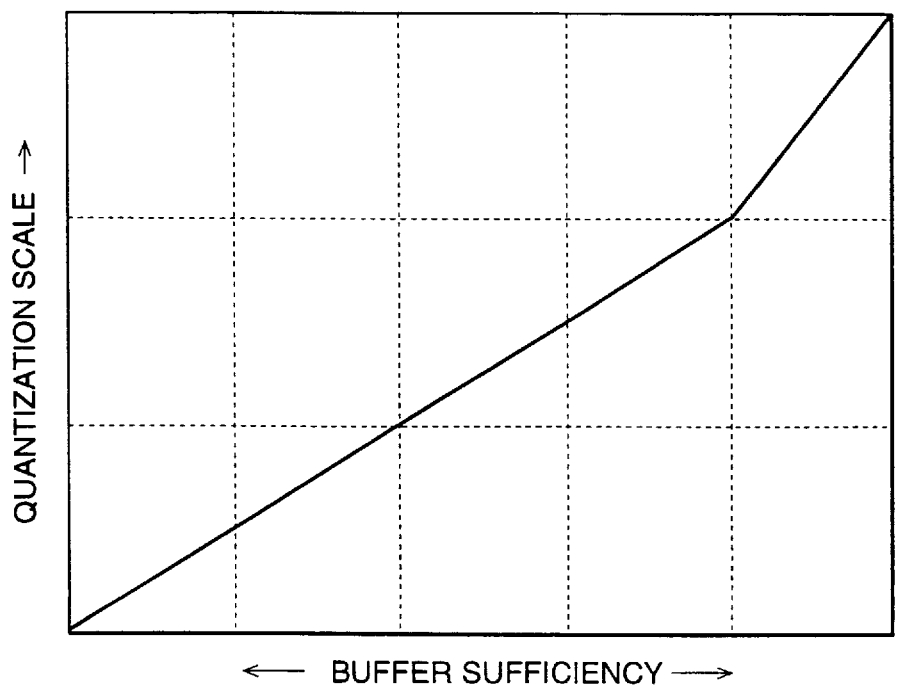
FIG. 6 depicts a curve representing the relationship between buffer sufficiency and quantization scale (the number of quantized bits)

When the buffer sufficiency is zero, the buffer memory 16 is controlled by the output buffer controller 80 so as not to output encoded data. The maximum data transfer rate of the encoded data read out from the buffer memory 16 is set equal to the maximum transfer rate of a decoding apparatus that is connected to the output terminal 28. The transfer rate signal supplied from the output buffer controller 80 to the buffer memory 80 in response to the data amount signal (buffer sufficiency) is determined by the relationship between the buffer sufficiency and quantization scale of the buffer memory 16 as shown in FIG. 6.

The data amount outputted from the data amount counter 12 is further sequentially supplied to the data amount comparator 24 in the second coding operation.

Figure 7:
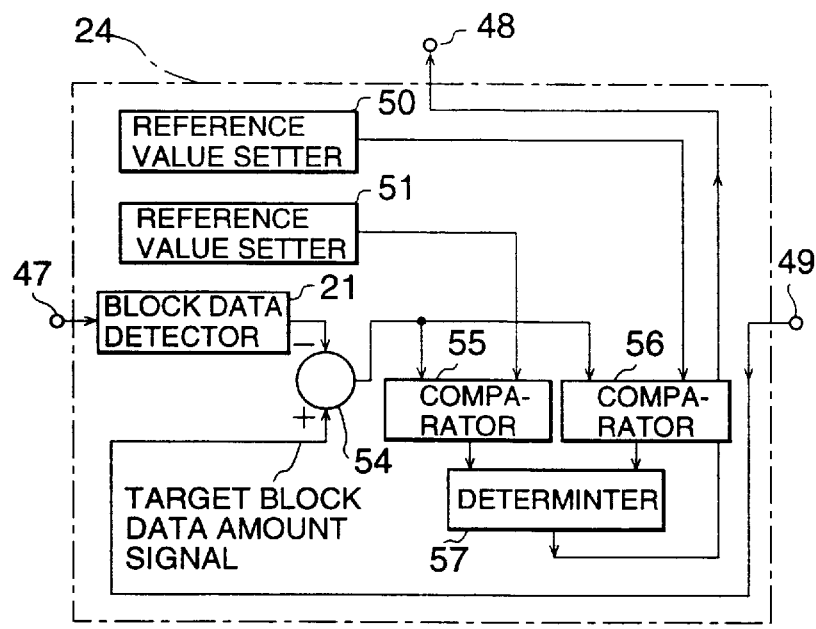
FIG. 7 shows a block diagram of a data amount comparator of the coding apparatus of FIG. 1.

The data amount comparator 24 will be described in detail with respect to FIG. 7. In FIG. 7, the data amount is supplied from the data amount counter 12 to a block data detector 21 via input terminal 47. Further, a target block amount signal is supplied from a accumulation error compensator 84 to a subtractor 54 via input terminal 49.

In response to the data amount, the block data detector 21 detects block data amount per block to generate a block data amount signal. The block data amount signal is supplied to the subtractor 54. The subtractor 54 subtracts the block data amount signal from the target block data amount signal to generate a difference block data amount signal. The difference block data amount signal is supplied to comparators 55 and 56 to which a positive and a negative reference value signal supplied from reference value setters 51 and 50, respectively.

The comparator 55 supplies a first comparison signal to a determiner 57 when the difference block data amount signal is positive and larger than the positive reference value signal supplied from reference value setter 51. On the other hand, the comparator 56 supplies a second comparison signal to the determiner 57 when the difference block data amount signal is negative and smaller than the negative reference value signal supplied from reference value setter 50. The difference block data amount signal supplied from the subtractor 54 is positive (negative) when the target block data amount is larger (smaller) than the generated block data amount. Both the comparators 55 and 56 supply a third comparison signal to the determiner 57 when the difference block data amount signal is in the range of the positive and negative reference value signals, that is, the difference block data amount is smaller than a predetermined difference set by the setters 50 and 51.

The determiner 57 supplies a quantization scale control signal per block to the quantization controller 6 via output terminal 48 and switch 26 to make small the quantization scale of the quantization controller 6 in response to the first comparison signal but large to the second comparison signal. On the other hand, the determiner 57 does not change the quantization scale of the quantization controller 6 in response to the third comparison signal.

In FIG. 1, the quantization scale setter 25 supplies only the quantization scale control signal for quantization scale setting in the initial block of each picture to the quantization controller 6 via switch 18 in the second coding operation. This quantization scale control signal is used to change the total data amount of the video signal to be coded to the largest amount T2 but less than a target total data amount. The target total data amount corresponds, for example, to the total storage capacity of a storage medium that is used to store the video signal.

More in detail, the quantization scale control signal for quantization scale setting in the initial block of each picture is generated based on two signals. The first signal is the reference quantization scale signal supplied from the reference quantization scale setter 17 to the quantization controller 6 via switch 18 in the first coding operation. The second signal is picture data amount signal supplied from the accumulation error compensator 84 to the quantization scale setter 25. The second signal is generated based on signals supplied from the target data amount memory 23 and a target data amount resetter 83.

The signal supplied from the target data amount memory 23 is obtained based on the data amount from a target code amount converter 22 that converts the data amounts per block and picture to target amounts.

As described in the first coding operation, the data amounts obtained by the temporal data amount counter 19 have been stored in the temporal data amount memory 20 and supplied to the data amount converter 13. The data amounts are of each block data, each picture data, and each GOP data of the video signal. These data amounts are used for determining the data amount conversion characteristics to converts the total data amount of the video signal to the largest amount but less than the target amount. As described above, the target amount corresponds to the storage capacity of the storage medium to store the video signal.

More in detail, the temporal data amount T1(i) of each of the sequential GOPs obtained in the first coding operation is supplied to the data amount converter 13. The data amount converter 13 determines the data amount conversion characteristics fg to convert the total data amount of the video signal to the largest amount T2 but less than the target amount. The target data amount T2(i) of each of the sequential GOPs is supplied from the data amount converter 13 and stored into the target transfer rate setter 15. Here, "i" of T1(i) and T2(i) is a numeral 1 to n that denotes the order of the sequential GOPs.

On the other hand, in the second coding operation, the data amount converted from the temporal data amount T1(i) to the target data amount T2(i) by an appropriate data amount conversion characteristics fg is stored in the target transfer rate setter 15. Further, the temporal data amounts of each of sequential blocks, pictures, and GOPs are stored in the temporal data amount memory 20. Here, the appropriate data amount conversion characteristics fg is obtained as follows by the relationship (2) described before:

$$fg(x)=T2(i)/T1(i)\cdot x$$

In the second coding operation, the data amounts of blocks, pictures, and GOPs are supplied from the temporal data amount memory 20 to the target data amount converter 22 via transfer lines 44 to 46. To the target data amount converter 22, the target data amount T2(i) of sequential GOPs stored in the target transfer rate setter 15 and the data amount signal from the accumulation error compensator 84 have already been supplied.

The target data amount converter 22 converts the temporal amounts of encoded data of each of sequential blocks and pictures to the target amounts corrected by the data amounts actually generated in the second coding operation. The corrected target amounts of block and picture data are supplied to the target data amount memory 23. The corrected target amounts are selectively supplied to the target data code amount resetter 83 and the accumulation error compensator 84, and the subtractor 85.

In other words, the target data amount converter 22 converts the data amounts of the sequential blocks and pictures to the specific target data amounts under the relationship T2/T1. Here, T1(i) is the temporal data amount of GOP and T2(i) is the target data amount corrected by the output signal of the accumulation error compensator 84.

The target data amount converter 22 will further be described with reference to FIG. 8. In the figure, Tp1(0), Tp1(1), . . . , and Tp1(n) denote the temporal data amounts of sequential pictures, and Tp2(0), Tp2(1), . . . , and Tp2(n)

the target data amounts of the sequential pictures. Suppose that the temporal amount T1(i) of a GOP is converted to the target code amount T2(i), that is data amount conversion is made by the conversion characteristics expressed by fg(x) =T2(i)/T1(i) when the temporal data amounts of a plurality of pictures that consists of the GOP are Tp1(0), Tp1(1), . . . , and Tp1(n). In this case, the temporal data amounts Tp1(0), Tp1(1), . . . , and Tp1(n) are also converted to the target data amounts Tp2(0), Tp2(1), . . . , and Tp2(n), respectively, by the conversion characteristics expressed by fg(x)=T2(i)/T1(i).

Figure 8:
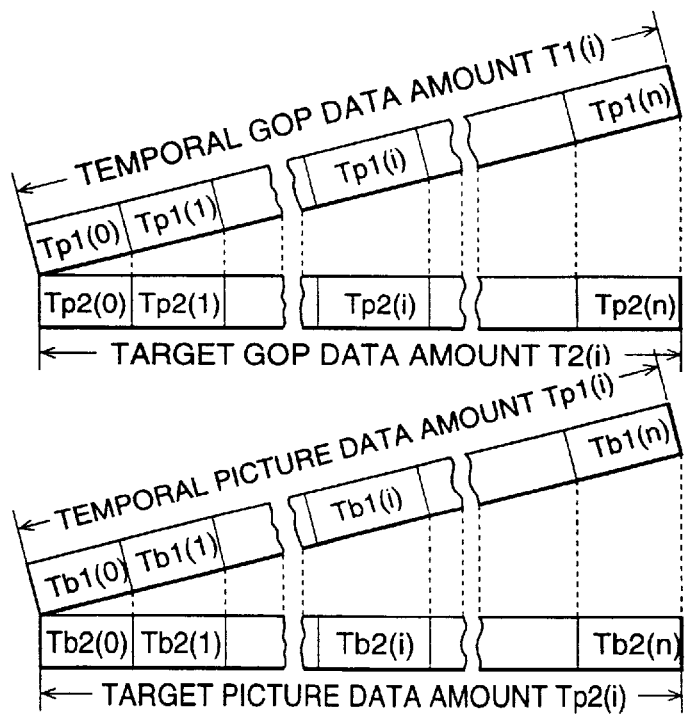
FIG. 8 is a schematic illustration for explaining encoded data amount change.

Further, in FIG. 8, Tb1(0), Tb1(1), . . . , and Tb1(n) denote the temporal data amounts of sequential blocks stored in the temporal data amount memory 20 and Tb2(0), Tb2(1), . . . , and Tb2(n) the target data amounts of the sequential blocks corrected by the output signal of the accumulation error compensator 84. Suppose that the temporal data amount of a picture is Tp(i) is converted to the target code amount Tp(i), that is data amount conversion is made by the conversion characteristics expressed by fg(x)=Tp2(i)/Tp1(i)·x= T2(i)/T1(i)·x when the temporal code amounts of a plurality of blocks that consists of the picture are Tb1(0), Tb1(1), . . . , and Tb1(n). In this case, the temporal data amounts Tb1(0), Tb1(1), . . . , and Tb1(n) are also converted to the target data amounts Tb2(0), Tb2(1), . . . , and Tb2(n), respectively, by the conversion characteristics expressed by fg(x)=Tp2(i)/ Tp1(i)·x=T2(i)/T1(i)·x.

FIG. 8 shows that the ratio of the corrected temporal data amount and the corrected target data amount in the upper stage (GOP) of encoded data is applied to the lower stage (picture) of encoded data for proportional distribution. However, not only limited to this, weighting can be done in accordance with the above described expression (3), that is, fg(x)=a·x^b.

The output data of the target data amount converter 22 are supplied to the target data amount memory 23. Here, the output data are of the corrected target data amounts of the sequential blocks and pictures. The output data are supplied to the target data amount resetter 83, the accumulation error compensator 84, and the subtractor 85.

As described above, in the second coding operation, the sequential encoded data outputted from the encoder 7 are supplied to the buffer memory 16 via switch 11 under the control of the output buffer controller 80. The data amount of the output data is supplied to the data amount comparator 24 and the subtractor 85 via data amount counter 12. The encoded data stored in the buffer memory 16 are sequentially read therefrom at the transfer rate based on the transfer rate signal given by the output buffer controller 80 and outputted via output terminal 28 at variable transfer rate. The output encoded data are stored into a storage medium or transferred via transmission line to a receiving apparatus.

A reproducing apparatus for reproducing the recorded data from a storage medium is provided with a decoder that decodes the data high efficiently encoded as described above. A receiving apparats for receiving the high efficiently encoded data is also provided with such a decoder. Such a decoder works only when the encoded data amount is suitable for decoding capability of the decoder.

For this reason, the moving picture coding apparatus with total data amount control according to the present invention is provided a decoder buffer simulator 81 as shown in FIG. 1. The decoder buffer simulator 81 controls the amount of the encoded data outputted via output terminal 28 so that data overflow or underflow will arise in a buffer memory in the decoding apparatus.

Figure 9:
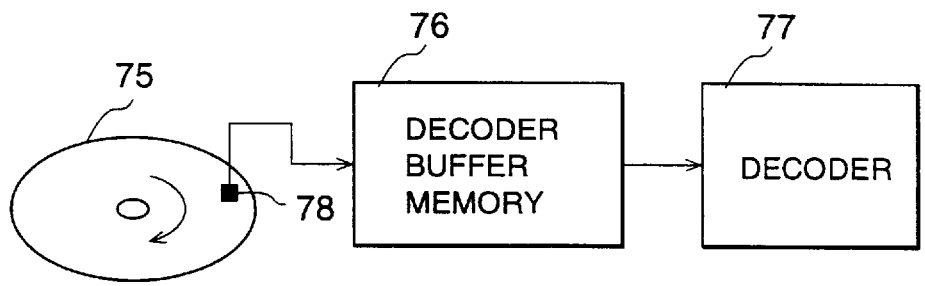
FIG. 9 shows a block diagram of a decoding apparatus used for decoding the video signal coded by the coding apparatus of FIG. 1 in order to explain a decoder buffer simulator of the coding apparatus.

The decoder buffer simulator 81 will be described with reference to FIG. 9. FIG. 9 shows a decoding apparatus for decoding the high efficiently encoded data by the coding apparatus of FIG. 1. The decoding apparatus is provided with a pickup 78 that reads the high efficiently encoded data stored on a storage medium 75. The decoding apparatus is also provided with a decoder buffer memory 76 and a decoder 77. The encoded data read out from the storage medium 75 by the pickup 78 is once stored in the decoder buffer memory 76 and the decoded by the decoder 77.

Figure 10:
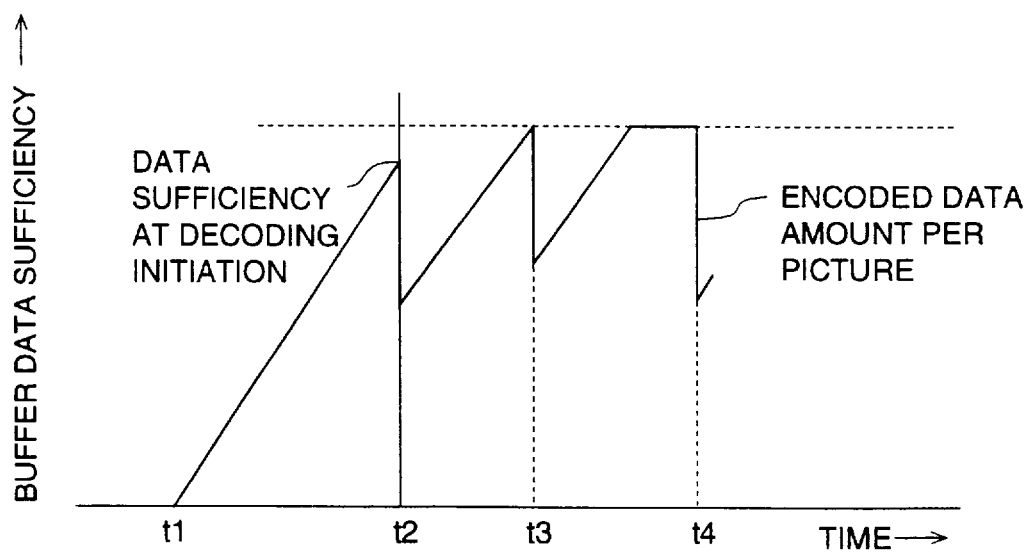
FIG. 10 depicts a curve representing data sufficiency characteristics of the decoder buffer memory of the decoding apparatus.

FIG. 10 depicts variation of data sufficiency of the decoder buffer memory 76 when the high efficiently encoded data of one picture is supplied to the decoding apparatus of FIG. 9 from the coding apparatus of FIG. 1. In FIG. 10, supply of the high efficiently encoded data to the decoder buffer memory 76 just starts at a period t1. The transfer rate of the high efficiently encoded data to the decoder buffer memory 76 is within the highest transfer rate of the decoding apparatus.

The decoder 77 initiates decoding operation at a period t2 where data sufficiency of the decoder buffer memory 76 reaches a predetermined data sufficiency. At the period t2, the encoded data of one picture is supplied from the decoder buffer memory 76 to the decoder 77. The decoder buffer memory 76 continues to store the high efficiently encoded data from the storage medium 75 via pickup 78 until the data sufficiency reaches 100%.

The encoded data amounts corresponding to the data sufficiency of the decoder buffer memory 76 and to the decoder 77 are predetermined by the decoder buffer simulator 81 of the coding apparatus shown in FIG. 1. The decoder buffer simulator 81 supplies a decoder buffer sufficiency signal to the target data amount resetter 83 so that the data overflow or underflow will not arise in the decoder buffer memory 76 of FIG. 9. The decoder buffer sufficiency signal is supplied based on the data sufficiency of the buffer memory 16 and the output transfer rate of the coding apparatus of FIG. 1 and the data sufficiency of the decoder buffer memory 76 of the decoding apparatus of FIG. 9.

In response to the data sufficiency signal from the decoder buffer simulator 81 and the encoded data of target amount from the target data amount memory 23, the target data amount resetter 83 generates a reset target data amount signal. The resetting target data amount signal is used such that the data overflow or underflow will not arise in the decoder buffer memory 76 of FIG. 9.

Figure 11:
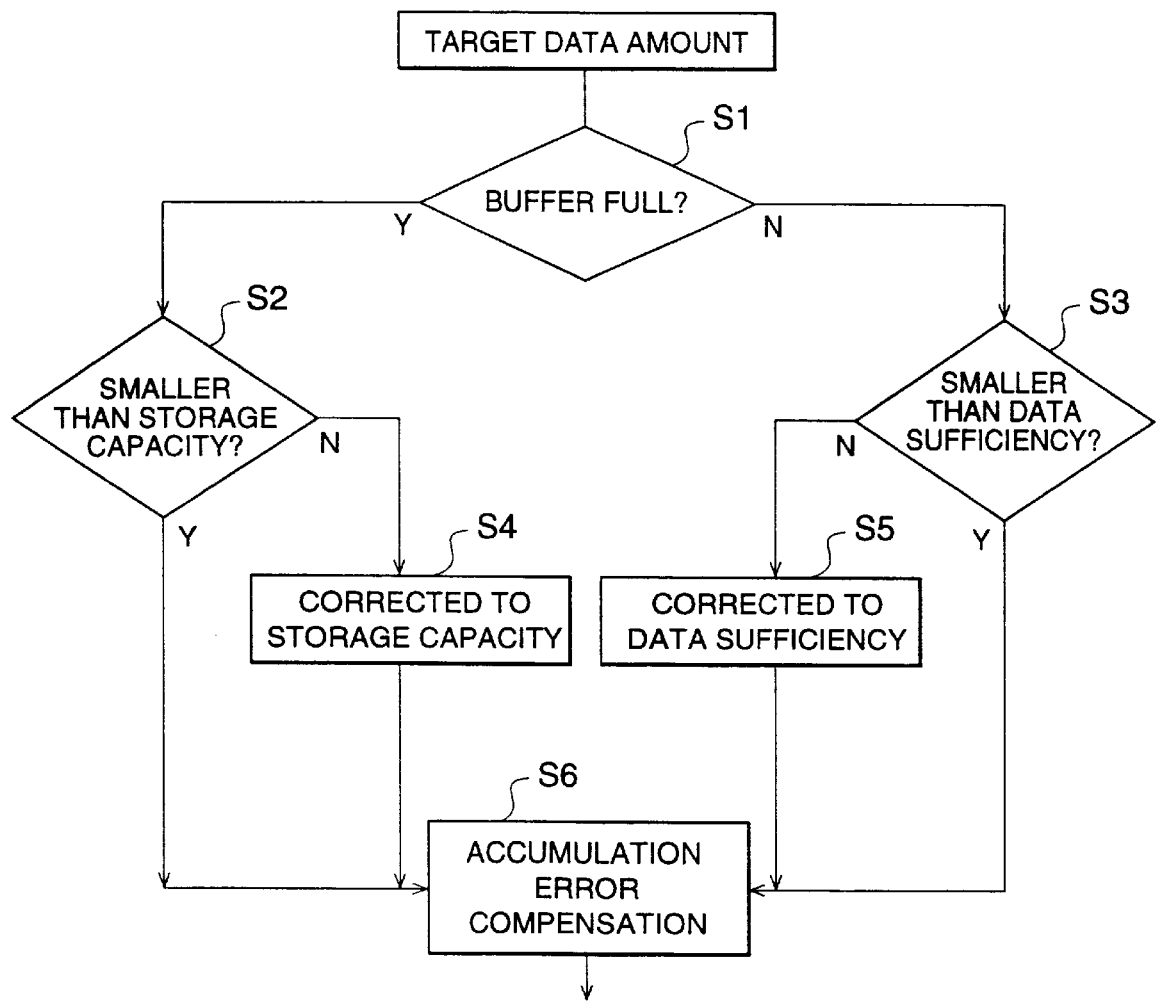
FIG. 11 is a flowchart explaining a target data amount resetter of the coding apparatus of FIG. 1.

The target data amount resetter 83 of FIG. 1 will be described with respect to FIG. 11. In step S1, check is made whether the data sufficiency of the decoder buffer memory 76 of FIG. 9 reaches 100% (full). If so (Yes), the process goes to step S2, if not (No), step S3.

In step S2, check is made whether the target picture data amount of the decoder buffer memory 76 supplied from the target data amount memory 23 of FIG. 1 is smaller than the storage capacity of the decoder buffer memory 76. If so, the process goes to step S6 where the target picture data amount signal is supplied to the accumulation error compensator 84 of FIG. 1. If not in step S2, the process goes to step S4 where the target picture data amount is corrected to a target picture data amount suitable to the storage capacity of the decoder buffer memory 76. Then the process goes to step S6 where the corrected target picture data amount is supplied to the accumulation error compensator 84.

On the other hand, if the process goes to step S3 from step S1, check is made whether the target picture data amount is smaller than the data sufficiency of the decoder buffer memory 76. If so, the process goes to step 6. If not, the process goes to step S5 where the target picture data amount is corrected to the amount corresponding to the data sufficiency of the decoder buffer memory 76.

In FIG. 1, the output of the subtractor 85 is sequentially supplied to an accumulation error counter 82. The sequential outputs are data amount errors ER and each error ER is the difference between the target data amount from the target code amount memory 23 and the data amount from the data amount counter 12. The accumulation error counter 82 accumulates the data amount errors ER per picture and supplies the accumulated error ERα per picture to the accumulation error compensator 84.

The accumulation error compensator 84 corrects the reset target picture data amount signal from the target data amount resetter 83 by means of the accumulated error ERα. The corrected reset target picture data amount signal is supplied to the quantization scale setter 25, the data amount compensator 24, and the target data amount converter 22.

The accumulation error correction of the accumulation error compensator 84 is executed such that the accumulated error ERα is distributed to pictures of a GOP after the period where the accumulated error ERα is obtained.

When K number of pictures exist after the period where the accumulated error ERα is obtained, the corrected target picture data amount can be obtained by adding the target picture data amount and the data amount expressed by the following expression (4) or (5):

$$\frac{ER\alpha \times 2T_{2pi}}{\sum_{k=1}^{j} T_2p(k)} \quad (5)$$

Here, $\Sigma T_{2pi}$ is the total of the target picture data amount of pictures i to be coded and stored in the target data amount memory 23. The sign "i" represents the number of sequential pictures.

The corrected target picture data amount signal thus obtained above is supplied to the quantization scale setter 25, the data amount compensator 24, and the target data amount converter 22.

According to the moving picture coding apparatus with total data amount control, the encoded data amount is checked again in the second coding operation to correct the target data amount. Therefore, the encoded data amount outputted from the buffer memory, in the second coding operation, is always suitable for the storage capacity of a storage medium that stores the encoded data.

Further, high picture quality video signal is always obtained when reproducing from the storage medium. This is due to the decoder buffer simulator that resettes the target data amount of the encoded data in consideration of the data capacity of the storage medium.

What is claimed is:

1. An apparatus for coding a video signal comprising:
    coding means for coding the video signal by high efficient predictive coding to produce first encoded data;
    counting means for counting a data amount of the first encoded data;
    first converting means for converting the data amount of the first encoded data to a plurality of different data amounts by means of a plurality of different data amount conversion characteristics;
    first comparing means for comparing the different data amounts with a reference data amount to find a maximum data amount among the different data amounts within the reference data amount, the maximum data amount being outputted as a target data amount;
    control means, responsive to the target data amount, for controlling quantization in the high efficient predictive coding by the coding means, under the control of the control means, the coding means again coding the video signal to produce second encoded data; subtracting means for subtracting the first encoded data from the second encoded data to produce data amount error;
    changing means for changing the target data amount of the first encoded data based on the data amount error;
    second comparing means for comparing the data amount of the second encoded data and the changed target data amount of the first encoded data to produce a first signal for controlling a quantization scale of the coding means;
    setting means for setting the quantization scale in response to the changed target data amount to produce a second signal for controlling the quantization scale, wherein the first and second signals are supplied to the control means to control the quantization in the high efficient predictive coding by the coding means; and
    output means for outputting the second encoded data at a specific data transfer rate.

2. The apparatus according to claim 1, wherein the first encoded data includes a plurality of sequential data groups, each data group having a plurality of sequential picture data, and each picture data having a plurality of sequential block data, the counting means comprising:
    means for counting a data amount of each of the sequential block data to output sequential block data amounts;
    means, responsive to the sequential block data amounts, for counting a data amount of each of the sequential picture data to output sequential picture data amounts; and
    means, responsive to the sequential picture data amounts, for counting a data amount of each of the sequential data to output sequential data group amounts.

3. The apparatus according to claim 1, further comprising means, responsive to the second encoded data, for controlling the target data amount of the first encoded data to meet a data capacity of storage means that stores the second encoded data, the first encoded data of the controlled target data amount being supplied to the changing means.

4. The apparatus according to claim 1, the second comparing means comprising:
    means for subtracting the data amount of the second encoded data from the changed target data amount of the first encoded data to produce a difference amount; and
    means for comparing the difference amount with a reference positive amount and a reference negative amount to produce a first difference signal when the changed target data amount of the first encoded data is larger than both the data amount of the second encoded data and the reference positive amount, to produce a second difference signal when the changed target data amount of the first encoded data is smaller than the data amount of the second encoded data but larger than the reference negative amount, and to produce a third difference signal when the difference amount is between the reference positive and negative amounts, one of the first, second, and third difference signals being outputted as the first signal.

5. A method for coding a video signal comprising the steps of:
    coding the video signal by high efficient predictive coding to produce first encoded data;
    counting a data amount of the first encoded data;
    converting the data amount of the first encoded data to a plurality of different data amounts by means of a plurality of different data amount conversion characteristics;

comparing the different data amounts with a reference data amount to find a maximum data amount among the different data amounts within the reference data amount, the maximum data amount being outputted as a target data amount;

controlling quantization in the high efficient predictive coding, in response to the target data amount, the video signal being coded again to produce second encoded data;

subtracting the first encoded data from the second encoded data to produce data amount error;

changing the target data amount of the first encoded data based on the data amount error;

producing a first signal for controlling a quantization scale of the coding by comparing the data amount of the second encoded data and the changed target data amount of the first encoded data;

producing a second signal for controlling the quantization scale by setting the quantization scale in response to the changed target data amount, wherein the first and second signals are used to control the quantization in the high efficient predictive coding; and outputting the second encoded data at a specific data transfer rate.

6. The method according to claim 5, wherein the first encoded data includes a plurality of sequential data groups, each data group having a plurality of sequential picture data, and each picture data having a plurality of sequential block data, the counting step comprising the steps of:

counting a data amount of each of the sequential block data to output sequential block data amounts;

counting a data amount of each of the sequential picture data in response to the sequential block data amounts to output sequential picture data amounts; and counting a data amount of each of the sequential data groups in response to the sequential picture data amounts to output sequential data group amounts.

7. The method according to claim 5, further comprising the step of controlling the target data amount of the first encoded data in response to the second encoded data to meet a data capacity of storage means that stores the second encoded data.

8. The method according to claim 5, the first signal producing step comprising the steps of:

subtracting the data amount of the second encoded data from the changed target data amount of the first encoded data to produce a difference amount; and comparing the difference amount with a reference positive amount and a reference negative amount to produce a first difference signal when the changed target data amount of the first encoded data is larger than both the data amount of the second encoded data and the reference positive amount, to produce a second difference signal when the changed target data amount of the first encoded data is smaller than the data amount of the second encoded data but larger than the reference negative amount, and to produce a third difference signal when the difference amount is between the reference positive and negative amounts, one of the first, second, and third difference signals being outputted as the first signal.

9. The method according to claim 5, the setting step comprising the steps of:

checking whether a data sufficiency of storage means that store the second encoded data is full;

checking, if full, whether the target data amount is smaller than a storage capacity of the storage means;

changing, if not smaller, the target data amount to meet the storage capacity;

checking, if not full, whether the target data amount is smaller than the data sufficiency; and changing, if not smaller, the target data amount to meet the data sufficiency.

* * * * *